2,895,882
PRODUCTION OF GLUTAMYL POLYPEPTIDE BY BACILLUS SUBTILIS

Curtis B. Thorne, Riley D. Housewright, and Carmen G. Leonard, Frederick, Md.

No Drawing. Application October 16, 1957
Serial No. 690,591

3 Claims. (Cl. 195—96)

(Granted under Title 35, U.S. Code (1952), sec. 266)

The invention described herein may be manufactured and used by or for the Government of the United States of America for governmental purposes without the payment to us of any royalty thereon.

This application is a continuation-in-part of our application Serial No 497,482, filed March 28, 1955, now abandoned.

This invention relates to a medium and a method of culturing the organism Bacillus subtilis ATTC 9945a. In practicing the present invention the particular organism used was a result of a repeated selection of the organism Baccillus subtilis ATCC 9945. This latter organism was streaked on agar plates suitably inoculated with the medium described hereafter. Those colonies which appeared most mucoid were selected and again streaked on new plates. After repeating this process several times, an increasing percentage of the colonies became mucoid and correspondingly fewer of the colonies were rough. This organism strain, which the inventors designated as CD2, and which carries this designation in their records, has been deposited with the American Type Culture Collection where it has received the accession number 9945a, it being the first mutant received of the parent strain 9945.

The preferred medium for growing this organism is composed of the following:

TABLE 1

| | Gms./liter |
|---|---|
| L-glutamic acid | 20 |
| Citric acid | 12 |
| Glycerol | 80 |
| $NH_4Cl$ | 7 |
| $K_2HPO_4$ | 0.5 |
| $MgSO_4.7H_2O$ | 0.5 |
| $FeCl_3.6H_2O$ | 0.04 |
| $CaCl_2.2H_2O$ | 0.15 |
| $ZnSO_4.7H_2O$ | 0.001 |
| $MnSO_4.H_2O$ | [1] 0.001–0.1 |

Distilled water to 1 liter.
pH 7.4 with NaOH.

[1] The concentration of $MnSO_4.H_2O$ is varied to give the desired average D-glutamic acid content of the peptide.

One-liter Erlenmeyer flasks containing 150 ml. of the above medium were plugged with cotton and sterilized by autoclaving at 15 pounds steam pressure for 20 minutes. The flasks were inoculated with about $2\times10^6$ spores of B. subtilis CDII (ATCC 9945a). The flasks are incubated 3–4 days on a reciprocating shaker running at a rate of 100–5 cm. strokes per minute. Yields of polypeptide in excess of 15 mg. per ml. are obtained.

Although the medium given in Table 1 is preferred, other proportions of ingredients, within limits, and other sources of ions may be used. Thus, while ammonium ion is essential for high yields of the peptide, various sources of the ion can be used other than the $NH_4Cl$. The latter was prepared over $NH_4OH$, for instance, as $NH_4Cl$ maintained the pH at a lower value over a longer period of time. The useful range of $NH_4Cl$ concentration is about 5 to 10 mg. per ml., although concentrations of 3.5 to 21.0 mg. per ml. were tried. The latter concentration proved to be inhibitory, however. The optimum concentration is not sharp but 7.0 mg. per ml. is the best of those tested and is the optimum range.

The presence of Fe, Mn, Mg, K, and Zn ions is essential for growth of the organism and the concentrations given in Table 1 are adequate for optimum growth, although other levels can be used. A source of P is also essential to the growth of the organism but variations in concentrations of $K_2HPO_4$ from 0.5 to 3.0 gr. per liter did not affect the yield.

The presence of an adequate amount of glutamic acid is essential to high yields of the peptide. Increasing the concentration to 12 gr./liter appeared essential in order that substantial yields should result and 20 gr. per liter is preferable. The glycerol and citric acid appear to control the pH of the medium. The absence of glycerol results in a rapid increase of pH to 8.5 or higher and in corresponding low peptide yields. The absence of citric acid also results ultimately in high pH values and corresponding low yields. Concentrations of citric acid of 4, 8, 12 and 16 mg. per ml. were tried and of these, 12 mg. per ml. appeared to be the best, although the curve did not have a sharp optimum. Glycerol concentrations of 20–80 gr. per liter includes the useful range. In the case of both glycerol and citric acid, the mechanism is the same, namely, the maintaining of a low pH to prevent enzymatic hydrolysis. In the example shown the pH of the medium was adjusted to 7.4 at the start, but a pH of 5.5 to 6.0 was maintained during the incubation period. For good yields of polypeptide it is desirable that the pH of the medium be 7.0 or less. Although only L-glutamic acid was used in the medium, D-glutamic acid appeared in the peptide samples to the extent of 20 to 80% of the glutamic acid present. The higher percentages of D-glutamic acid appeared in the static cultures having the lower production rates.

By varying the concentration of $MnSO_4.H_2O$ over a range of 1 to 100 μg. per ml. the average percentage of D-glutamic acid in the polypeptide can be controlled.

The effect of manganese and calcium concentrations on growth and peptide synthesis is shown in the following table:

TABLE 2

| $MnSO_4.H_2O$, µg/ml. | $CaCl_2.H_2O$, kg/ml. | Growth¹—Incubation time in hours | | Bound glutamic acid (polypeptide)—Incubation time in hours | | | |
|---|---|---|---|---|---|---|---|
| | | | | 40 | | 90 | |
| | | 40, organism/ml. | 66, organism/ml. | Total, mg./ml. | D-isomer, percent | Total, mg./ml. | D-isomer, percent |
| 0 | | 1.0×10⁵ | 1.1×10⁴ | trace | | trace | |
| 0.01 | | 1.0×10⁵ | 1.0×10⁴ | 0.90 | | 0.90 | |
| 0.03 | | 1.7×10⁹ | 4.7×10⁷ | 7.75 | 38 | 7.90 | 39 |
| 0.23 | | 1.8×10⁹ | 1.0×10⁷ | 7.27 | 49 | 7.98 | 46 |
| 5.2 | | | | 11.17 | 75 | 13.80 | 68 |
| 26 | | | | 12.67 | 85 | 16.73 | 74 |
| 52 | | | | 13.33 | 85 | 18.23 | 78 |
| 104 | | 1.8×10⁹ | 1.7×10⁹ | 14.17 | 83 | 19.63 | 81 |
| 208 | | | | 12.65 | 84 | 18.78 | 84 |
| 416 | | | | 12.50 | 85 | 19.63 | 86 |
| 832 | | | | 6.34 | | 8.88 | 86 |
| 0.03 | 150 | 1.5×10⁹ | 1.0×10⁷ | 13.67 | 37 | 17.75 | 39 |
| 52 | 150 | | | 13.05 | | 17.45 | 82 |
| 104 | 150 | | | 12.38 | | 17.05 | 82 |

¹ All the samples had 10⁴ spores/ml. after 6 days of growth.

The addition of 0.03 µg. of $MnSO_4.H_2O$ and 1.0 µg. of $ZnSO_4.7H_2O$ per ml. gave the same growth curve as obtained with tap water, but low yields of polypeptide were synthesized. Further studies showed that Mn was not only essential for growth but also for polypeptide synthesis. As shown in Table 2, about 0.03 µg. of $MnSO_4.H_2O$ per ml. was required for maximum growth in this medium prepared with triple distilled water. Additional amounts of $Mn^{++}$ stimulated the synthesis of polypeptide, and the previously reported maximum yield, 15–20 mg. per ml., was obtained when the concentration of $MnSO_4.H_2O$ was increased. The data in Table 2 also show that $Mn^{++}$ affected not only the yield of polypeptide obtained, but also the percentage of D-glutamic acid in polypeptide. The average D-glutamic acid content increased from about 39 percent to 85 percent following the addition of increasing amounts of $Mn^{++}$. Two different polypeptides have been isloated from the same cultiure filtrate of *B. subtilis*. One of these peptides contained about 50% D-glutamic acid and the other one contained about 100% D-glutamic acid. It is probable that the values between 50–85% D-glutamic acid represent an average value of various proportions of these two polypeptides. $Ca^{++}$ could partially replace the $Mn^{++}$ requirement for peptide synthesis, but not for growth. However, $Ca^{++}$ had no effect on the percentage of D-glutamic acid in the polypeptide.

It is suggested that $Mn^{++}$ is the principal activator in the production and/or activity of the enzyme systems involved in the synthesis of D-glutamic acid and/or its incorporation into polypeptide. Another possibility is that $Mn^{++}$ is an inhibitor of the systems involved in L-glutamic acid incorporation into polypeptide.

A summary of the range of concentrations of the various components of the medium used is as follows:

TABLE 3

| | Gr. |
|---|---|
| Glutamic acid | 12–20 |
| Citric acid | 4–16 |
| Glycerol | 20–80 |
| $NH_4Cl$ | 5–10 |
| $K_2HPO_4$ | 0.5–3.0 |
| $MgSO_4$ | 0.5–3.0 |
| $FeCl_3.6H_2O$ | .04–.12 |
| $CaCl_2.2H_2O$ | .15–.5 |
| $ZnSO_4.7H_2O$ | .001–.005 |
| $MnSO_4.H_2O$ | .001–.1 |

$CaCl_2.2H_2O$; $ZnSO_4.7H_2O$ and $MnSO_4.H_2O$ should be present in the small amounts indicated and as discussed earlier, to insure growth as well as peptide synthesis. In the initial work on this project the latter components had been omitted, since they had been supplied by the particular tap water used. Since tap waters are necessarily dissimilar in salt content, the present nutrient media is calculated on the basis of using distilled water and supplying the trace salts as shown.

After culturing, the isolation of the peptide was accomplished by either of two methods indicated below:

(1) *Precipitation with ethanol.*—One liter of filtrate was obtained which contained 11.68 mg. of peptide per ml., calculated as glutamic acid. Half of the filtrate, at pH 6.5, was poured into 4 liters of ethanol to form a white cotton-like precipitate. The peptide was dissolved in 300 ml. of water and dialyzed against distilled water for 24 hours. This removed free glutamic acid which had precipitated with the peptide. The peptide was precipitated again by pouring the dialyzed solution into 8 volumes of ethanol. For this second precipitation it was necessary to adjust the pH of the solution to approximately 8 with NaOH in order to get quantitative precipitation. The peptide was dissolved in 100 ml. of water, dialyzed 24 hours against distilled water, and finally lyophilized. The yield was 5.76 g. of peptide (95 percent recovery, based on glutamic acid analysis) in the form of the sodium salt. This preparation (70–1) contained 9.40 percent nitrogen, and upon hydrolysis, 96.2 percent glutamic aiid was released. Of the total glutamic acid 45.1 percent was the D-isomer. The theoretical values for the sodium salt of glutamyl polypeptide $(C_5H_6O_3NNa)_\infty$ are 9.27 percent nitrogen and 97.4 percent glutamic acid released upon hydrolysis.

(2) *Precipitation with $CuSO_4$.*—A saturated solution of $CuSO_4$ was added to the other 500 ml. of the filtrate at pH 6.5 until a precipitate no longer formed. The gummy precipitate was collected by centrifugation, washed once with water, and added to 150 ml. of 1.5 N HCl. The peptide with about 50% D-glutamic acid dissolved slowly and then came out of solution again as an almost white, granular precipitate. The dark green supernatant solution contained most of the copper which was released from the peptide. The precipitate was washed twice with water and then dissolved in 200 ml. of water by adding 10 N NaOH. A small amount of copper was still present as evidenced by the blue color when the precipitate was dissolved by the addition of alkali. This was removed by passing $H_2S$ through the solution and filtering off the CuS. Then the colorless solution was acidified with HCl and the peptide precipitated again as the free acid. It was washed three times with water and finally suspended in water and lyophilized. The yield was 4.78 g. (92 percent recovery, based on glutamic acid analysis) of white material which was the free acid form of the peptide. This material (preparation 70-2) contained 10.81 percent nitrogen, and upon hydrolysis 113.0 percent glutamic acid was released. Of the total glutamic acid 46.6 percent was the D-isomer. The theoretical values for glutamyl polypeptide in the free acid form $(C_5H_7O_3N)_x$ are nitrogen, 10.85 percent and glutamic acid after hydrolysis, 113.9 percent. The free acid of peptide containing a high percentage of D-glutamic acid, i.e. 90–100% (sample B–II of Table 4), was soluble in water and 1 N HCl. Therefore, isolation of this peptide was done by ethanol precipitation of the sodium salt.

Analytical data for four preparations are summarized in Table 4. The purity of these as calculated from both the nitrogen and glutamic acid analyses was near 100 percent.

tender and that the half life in the blood stream is materially increased by polymerization. It was further found that the subjects of the tests showed no significant change in temperature, pulse or respiration and that they experienced no subjective symptoms whatever.

We claim:

1. A method of producing glutamyl polypeptide by culturing *Bacillus subtilis* ATCC 9945a on a medium comprising

| | Gr. |
|---|---|
| Glutamic acid | 12–20 |
| Citric acid | 4–16 |
| Glycerol | 20–80 |
| $NH_4^+$ as $NH_4Cl$ | 5–10 |
| $K_2HPO_4$ | .5–3.0 |
| $MgSO_4.7H_2O$ | .5–3.0 |
| $FeCl_3.6H_2O$ | .04–.12 |
| $CaCl_2.2H_2O$ | .15–.5 |
| $ZnSO_4.7H_2O$ | .001–.005 |
| $MnSO_4.H_2O$ | .001–0.1 |
| Distilled water to 1 liter. | |

TABLE 4

*Analysis of three peptide preparations*

| Prep. No. | Method of Isolation | Form of Peptide | Nitrogen, percent | Glutamic Acid | | Purity | |
|---|---|---|---|---|---|---|---|
| | | | | Total, percent | D-isomer, percent of total | Based on nitrogen value, percent | Based on glutamic acid value, percent |
| 66 | Precipitation with $CuSO_4$ and acid | Sodium salt | 9.64 | 96.8 | 50.2 | 103.9 | 99.4 |
| 70-1 | Precipitation with ethanol | do | 9.40 | 96.2 | 45.1 | 101.4 | 98.8 |
| | Theoretical for sodium salt $(C_5H_6O_3NNa)\infty$ | | 9.27 | 97.4 | | | |
| 70-2 | Precipitation with $CuSO_4$ and acid | Free acid | 10.81 | 113.0 | 46.6 | 99.6 | 99.2 |
| | Theoretical for free acid $(C_5H_7O_3N)\infty$ | | 10.85 | 113.9 | | | |
| BII | Precipitation with $CuSO_4$ and ethanol | Sodium salt | 9.3 | 99.8 | 94.0 | 100.3 | 102.5 |

The glutamyl polypeptides produced by this process have been found to be useful as blood plasma volume extenders. A summary of this property of the polypeptides of this invention is set forth in the "Proceedings of the Society for Experimental Biology and Medicine," vol. 83, No. 2, June 1953.

One of the requirements of a satisfactory blood plasma extender is that it shall not be too rapidly excreted by the kidneys. The rate of such excretion appears to be a function of molecular size, shape, surface configuration and charge. Where the molecular weights are between 12,000 and 15,000 the peptide is cleared from the blood stream of humans in 3 to 4 hours after injection. By polymerizing the glutamyl polypeptide with some of its partial degredation products, molecular weights estimated at about 80,000 are produced. These were sterilized by filtration and injected intravenously as 3% isotonic sodium salt solution.

In specific tests with these solutions, each subject was administered 3 gr. of the material per hour. Blood levels were taken 10 minutes after the end of injection, and at suitable intervals thereafter. Urinary excretion of the material was determined from the start of the injection and followed at least 24 hours.

The results of these tests showed that the polymerized glutamyl polypeptide is suitable as a blood serum ex- 2. A process in accordance with claim 1 wherein the medium comprises

| | Gms./liter |
|---|---|
| L-glutamic acid | 20 |
| Citric acid | 12 |
| Glycerol | 80 |
| $NH_4Cl$ | 7 |
| $K_2HPO_4$ | 0.5 |
| $MgSO_4.7H_2O$ | 0.5 |
| $FeCl_3.6H_2O$ | 0.04 |
| $CaCl_2.2H_2O$ | 0.15 |
| $ZnSO_4.7H_2O$ | 0.001 |
| $MnSO_4.H_2O$ | 0.001–0.1 |
| Distilled water to 1 liter. | | pH 7.4 with NaOH.

3. A process in accordance with claim 2 wherein the pH is maintained below 7.0.

References Cited in the file of this patent

Bovarnick, Jour. Biol. Chem., 145 (1942), pages 415–424.

Konikow: Science Digest, 37, 6, June 1953, pages 13–17.

Science News Letter for May 15, 1954, page 307.

UNITED STATES PATENT OFFICE

CERTIFICATE OF CORRECTION

Patent No. 2,895,882　　　　　　　　　　　　　　　　　　　　July 21, 1959

Curtis B. Thorne et al

It is hereby certified that error appears in the printed specification of the above numbered patent requiring correction and that the said Letters Patent should read as corrected below.

Column 2, line 13, for "prepared" read -- preferred --.

Signed and sealed this 5th day of April 1960.

(SEAL)
Attest:

KARL H. AXLINE　　　　　　　　　　　　　　　　　　　　　　ROBERT C. WATSON
Attesting Officer　　　　　　　　　　　　　　　　　　　　　Commissioner of Patents